United States Patent
Jiang et al.

(10) Patent No.: US 12,375,812 B2
(45) Date of Patent: Jul. 29, 2025

(54) FOLLOWING SHOOT METHOD, GIMBAL CONTROL METHOD, PHOTOGRAPHING APPARATUS, HANDHELD GIMBAL AND PHOTOGRAPHING SYSTEM

(71) Applicant: SZ DJI TECHNOLOGY CO., LTD., Shenzhen (CN)

(72) Inventors: Youwei Jiang, Shenzhen (CN); Junrong Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 384 days.

(21) Appl. No.: 17/560,214

(22) Filed: Dec. 22, 2021

(65) Prior Publication Data

US 2022/0116543 A1  Apr. 14, 2022

Related U.S. Application Data

(63) Continuation of application No. PCT/CN2019/100451, filed on Aug. 13, 2019.

(51) Int. Cl.
| | |
|---|---|
| *H04N 23/695* | (2023.01) |
| *G03B 17/56* | (2021.01) |
| *G05D 3/12* | (2006.01) |
| *H04N 23/667* | (2023.01) |

(52) U.S. Cl.
CPC ......... *H04N 23/695* (2023.01); *G03B 17/561* (2013.01); *G05D 3/12* (2013.01); *H04N 23/667* (2023.01)

(58) Field of Classification Search
CPC ............................. H04N 23/69; H04N 23/667
See application file for complete search history.

(56) References Cited

U.S. PATENT DOCUMENTS

| | | | |
|---|---|---|---|
| 2010/0079101 A1* | 4/2010 | Sidman | F16M 11/041 |
| | | | 224/272 |
| 2015/0201124 A1 | 7/2015 | Litvak et al. | |
| 2016/0246162 A1* | 8/2016 | Niemeyer | F16M 11/18 |
| | (Continued) | | |

FOREIGN PATENT DOCUMENTS

| | | |
|---|---|---|
| CN | 105678809 A | 6/2016 |
| CN | 105700543 A | 6/2016 |
| | (Continued) | |

OTHER PUBLICATIONS

International Search Report of PCT/CN2019/100451 (Feb. 18, 2021).

*Primary Examiner* — Jeremiah C Hallenbeck-Huber
(74) *Attorney, Agent, or Firm* — Fideli Law PLLC; Qiang Li

(57) ABSTRACT

The present disclosure provides a following shoot method, a gimbal control method, a photographing apparatus, a handheld gimbal and a photographing system, the following shoot method includes: determining whether in a following preparation mode; if in the following preparation mode, displaying an area identifier; determining whether a target occurs in an image is a photographing target based on the area identifier; if the target is the photographing target, detecting a control operation of a manual control member by a user; controlling a following shoot mode to be start or end based on the control operation.

19 Claims, 3 Drawing Sheets

---

Determine whether in a following preparation mode — S110

If the photographing apparatus is in the following preparation mode, displays a area identifier — S120

Determine whether a target shown in an image is a photographing target based on the area identifier — S130

Upon determining that the target shown in the image is the photographing target, detect a control operation on a manual control member by a user — S140

Control to start or end a following shoot mode based on the control operation — S150

(56) References Cited

U.S. PATENT DOCUMENTS

| | | | | |
|---|---|---|---|---|
| 2016/0381271 A1* | 12/2016 | Cheng | ................... | F16M 13/04 |
| | | | | 348/208.2 |
| 2017/0227162 A1* | 8/2017 | Saika | ..................... | H04N 23/50 |
| 2019/0041729 A1* | 2/2019 | Chen | .................... | H04N 23/651 |
| 2019/0064637 A1* | 2/2019 | Wang | ................ | F16M 11/2071 |
| 2019/0215451 A1* | 7/2019 | Enke | ...................... | G03B 17/56 |
| 2019/0215457 A1* | 7/2019 | Enke | ...................... | H04N 23/62 |
| 2019/0349533 A1* | 11/2019 | Guo | .......................... | G06F 3/16 |
| 2021/0051259 A1* | 2/2021 | Liao | .................... | H04N 23/695 |

FOREIGN PATENT DOCUMENTS

| | | | |
|---|---|---|---|
| CN | 105992903 | A | 10/2016 |
| CN | 106970627 | A | 7/2017 |
| CN | 107888818 | A | 4/2018 |
| CN | 108184061 | A | 6/2018 |
| CN | 108259703 | A | 7/2018 |
| CN | 108288281 | A | 7/2018 |
| CN | 109981972 | A | 7/2019 |
| WO | 2019104684 | A1 | 6/2019 |
| WO | 2019134117 | A1 | 7/2019 |
| WO | 2019140686 | A1 | 7/2019 |

\* cited by examiner

Detect a control operation of the user on a manual control member, and control, based on the control operation, a photographing apparatus carried by a handheld gimbal to start or end a tracking photography mode ⸺S210

If control the photographing apparatus based on the control operation to start the following shoot mode, adjust the movement based on the control of the photographing apparatus, so that the photographing apparatus may perform the following shoot on a photographing target ⸺S220

FIG. 5

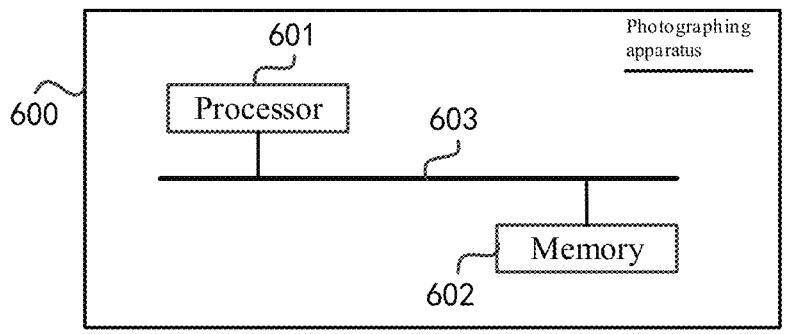

FIG. 6

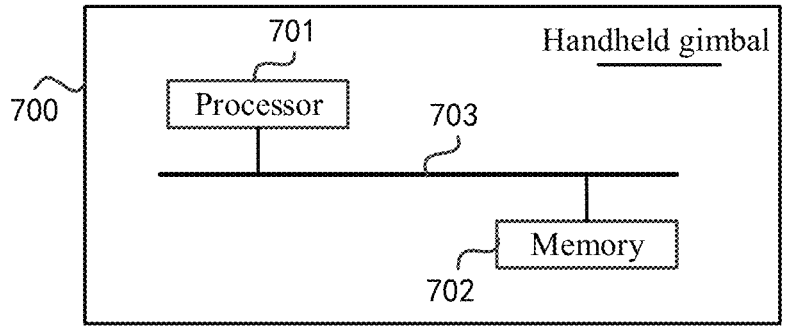

FIG. 7

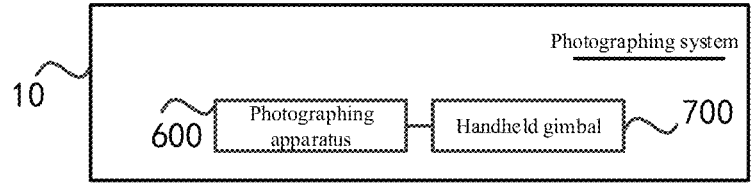

FIG. 8

FOLLOWING SHOOT METHOD, GIMBAL CONTROL METHOD, PHOTOGRAPHING APPARATUS, HANDHELD GIMBAL AND PHOTOGRAPHING SYSTEM

RELATED APPLICATIONS

The present patent document is a continuation of PCT Application Serial No. PCT/CN2019/100451, filed on Aug. 13, 2019, designating the United States and published in Chinese, which is hereby incorporated by reference in its entirety.

TECHNICAL FIELD

The present disclosure relates to the technical field of photographing, and specifically, to a following shoot method, a gimbal control method, a photographing apparatus, a handheld gimbal and a photographing system.

BACKGROUND

An intelligent following shoot function, involving gimbal following technology, may be applied to such as a handheld gimbal that carries a camera, a handheld gimbal that carries a mobile phone, or an integrated gimbal camera. It can achieve automatic stabilization during photographing, and shoot high-precision stable pictures anytime and anywhere.

Conventional mainstream photographing software requires clicking and/or a frame selection on the screen when it needs to perform following shoot on an object or person. This is less efficient and may miss the best time to shoot.

BRIEF SUMMARY

In view of the foregoing, the present disclosure provides a following shoot method, a gimbal control method, a photographing apparatus, a handheld gimbal, a photographing system and a storage medium, aims to resolve the technical problems that conventional following shoot method requires clicking and/or a frame selection on the screen in order to perform following shoot on an object or person, which is less efficient and may miss the best time to shoot.

According to a first aspect, the present disclosure provides a gimbal control method, which includes: detecting a first control operation on a manual control member of a handheld gimbal; and controlling, based on the first control operation, a photographing apparatus carried by the handheld gimbal to start a following shoot mode and adjust a movement of the handheld gimbal to enable the photographing apparatus to perform following shoot on a photographing target.

According to a second aspect, the present disclosure provides a handheld gimbal, including: a handle; a gimbal mounted on the handle; at least one storage medium storing a set of instructions for gimbal control; and at least one processor in communication with the at least one storage medium, where during operation, the at least one processor executes the set of instructions to: detect a first control operation on a manual control member of the handheld gimbal, and control, based on the first control operation, a photographing apparatus carried by the handheld gimbal to start a following shoot mode and adjust a movement of the handheld gimbal to enable the photographing apparatus to perform following shoot on a photographing target.

Embodiments of the present disclosure provide a tracking photography method, a gimbal control method, a photographing apparatus, a handheld gimbal, a photographing system and a storage medium, where determining a photographing target by displaying, when the photographing apparatus is in a tracking preparation mode, an area identifier, to prompt a user to put the photographing target in the area identifier; and controlling a tracking photography mode to be started or ended based on a control operation by the user on a manual control member, which is convenient for the user to quickly start or cancel the tracking photography, and avoid missing the best time of tracking photography.

It should be understood that above general description and the following detailed description are merely exemplary and explanatory, and should not limit the disclosure of the present disclosure.

BRIEF DESCRIPTION OF THE DRAWINGS

To clearly describe the technical solutions in the embodiments of the present disclosure, the following briefly describes the accompanying drawings required for describing some exemplary embodiments. Apparently, the accompanying drawings in the following description show merely some exemplary embodiments of the present disclosure, and a person of ordinary skill in the art may still derive other drawings from these accompanying drawings without creative efforts.

FIG. 5 is a schematic flowchart of a gimbal control method according to some exemplary embodiments of the present disclosure;

FIG. 6 is a schematic block diagram of a photographing apparatus according to some exemplary embodiments of the present disclosure;

FIG. 7 is a schematic block diagram of a handheld gimbal according to some exemplary embodiments of the present disclosure; and FIG. 8 is a schematic block diagram of a photographing system according to some exemplary embodiments of the present disclosure.

DETAILED DESCRIPTION

Figure 1:
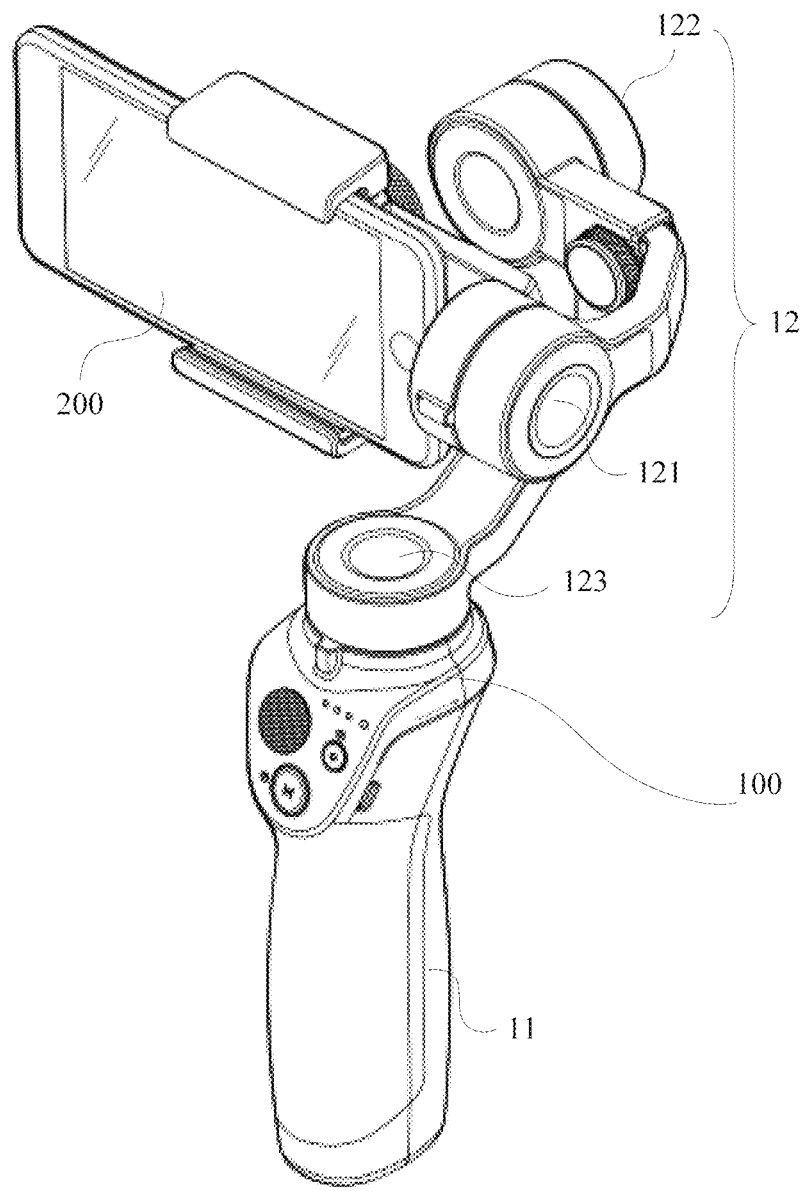
FIG. 1 is a schematic structural diagram of a handheld gimbal that carries a photographing apparatus.

The following describes the technical solutions in some exemplary embodiments of the present disclosure with reference to the accompanying drawings. Apparently, the described exemplary embodiments are merely some but not all of the embodiments of the present disclosure. All other embodiments obtained by a person of ordinary skill in the art based on the embodiments of the present disclosure without creative efforts shall fall within the scope of protection of the present disclosure.

The flowcharts shown in the drawings are only exemplary description, and are not necessarily include all the content and operations/steps, nor are necessarily to be executed in the order as described. For example, some operations/steps may also be decomposed, combined or partially combined, so the actual execution order may be changed according to actual conditions.

The following describes in detail some exemplary embodiments of the present disclosure with reference to the accompanying drawings. In absence of conflicts, the following embodiments and features in the embodiments may be combined.

A handheld gimbal may be a gimbal system that may carry a photographing apparatus or may be an integrated gimbal camera that may carry a photographing apparatus. The photographing apparatus includes a camera and a display screen, for non-limiting examples, the photographing apparatus may be a phone, a camera or a photographing assembly of an integrated gimbal camera. High-precision stable pictures may be photographed anytime and anywhere by using the handheld gimbal.

A handheld gimbal may carry a photographing apparatus, and may be configured to fix the photographing apparatus and change the height, inclination and/or direction of the photographing apparatus, or configured to keep the photographing apparatus in a certain attitude stably, so as to facilitate the photographing apparatus to photograph.

For example, FIG. 1 is a schematic structural diagram of a handheld gimbal that carries a photographing apparatus. The following describes a handheld gimbal in some exemplary embodiments of the present disclosure with reference to FIG. 1.

As shown in FIG. 1, the handheld gimbal 100 may include a handle 11 and a gimbal 12 mounted on the handle 11, the gimbal 12 may also carry a photographing apparatus 200. In some exemplary embodiments, the photographing apparatus 200 may be a smart phone; certainly, it may be other photographing apparatuses, such as a camera.

For example, the photographing apparatus 200 may be in communication with the handheld gimbal 100, for non-limiting example, the communication via a Bluetooth link or a data interface.

For example, after the handheld gimbal 100 and the photographing apparatus 200, such as a phone, are connected via a Bluetooth link, the handheld gimbal 100 may directly control a function of certain photographing software on the photographing apparatus 200 via a Bluetooth link, and at the same time, the photographing software on the photographing apparatus 200 may send an instruction to the handheld gimbal 100.

The gimbal 12 may include a three-axis motor, respectively a pitch axis motor 121, a roll axis motor 122 and a yaw axis motor 123, which may be configured to adjust the balanced attitude of the photographing apparatus 200, so as to photograph high-precision stable pictures anytime and anywhere.

An inertial measurement unit (IMU) that is mounted on the gimbal 12, may be, for non-limiting examples, at least one of an accelerometer or a gyroscope, which is configured to measure the attitude and acceleration or the like of the photographing apparatus 200, so as to adjust the balanced attitude of the photographing apparatus 200 based on the attitude.

The handle 11 is further provided with a control member so that a user may control the gimbal 12 or the photographing apparatus 200 by operating the control member. The control member may be, for non-limiting examples, a button, a trigger, a knob or a rocker, and certainly may include other forms of physical buttons.

For example, the rocker may be configured to control the movement of the three rotating shafts, thereby controlling the movement of the photographing apparatus 200. It is understood that the control member may be configured for other functions.

In some exemplary embodiments, there may be one or more control members. When there is one control member, different operation modes may be provided for the control member in order to generate different control instructions, the different operation modes herein may be, such as different quantity of presses; certainly, when there are more than one control members, such as a first control member, a second control member and a third control member, different control members may generate different control instructions.

It should be understood that the handheld gimbal in FIG. 1 and the above naming of the components of the handheld gimbal are for the purpose of identification only, but not limit the embodiments of the present disclosure.

Figure 2:
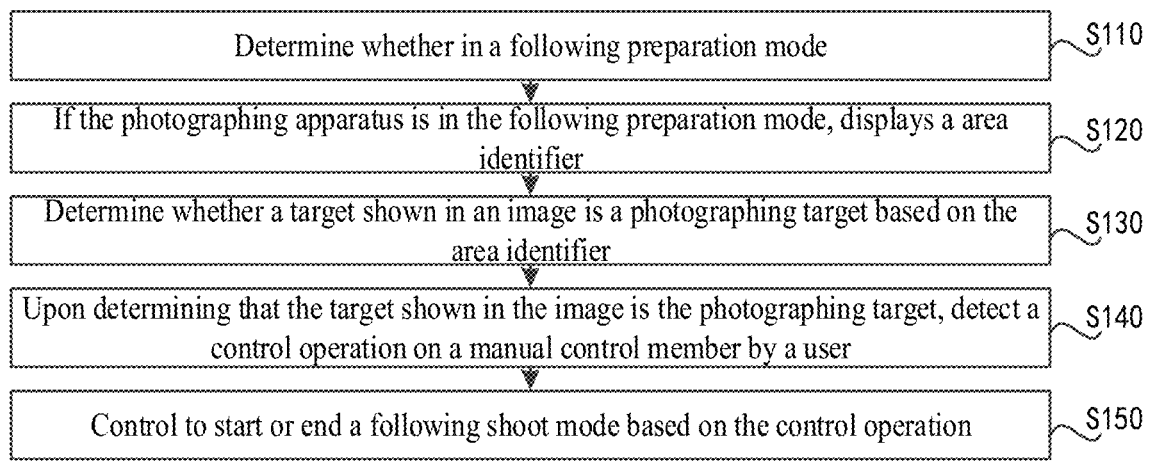
FIG. 2 is a schematic flowchart of a following shoot method according to some exemplary embodiments of the present disclosure.

Referring to FIG. 2, which is a schematic flowchart of a following shoot method according to some exemplary embodiments of the present disclosure. The following shoot method may be used for the photographing apparatus such as a mobile phone, a camera, or the like, or may be used for an integrated gimbal camera.

The following describes in detail a following shoot method provided in some exemplary embodiments of the present disclosure based on the photographing apparatus and the handheld gimbal in FIG. 1.

For example, a photographing apparatus may be, for non-limiting examples, a mobile phone, a camera or the like that is installed with a computer program for implementing a following shoot method. The photographing apparatus may capture an image by a camera, and may display information such as the photographed image or the like by a display screen.

As shown in FIG. 2, the following shoot method of the present embodiment may include step S110 to step S150. The method may be operated by a photographing apparatus as shown in FIG. 6.

S110, Determine whether the photographing apparatus is in a following preparation mode.

Specifically, if in the following shoot preparation mode, the photographing apparatus may switch from a following preparation mode to a following shoot mode based on the control of a user.

For example, the photographing apparatus may locally store a status code for indicating whether it is in the tracking preparation mode, and the photographing apparatus may determine whether it is in the tracking preparation mode by reading and parsing the status code.

For example, when the user sets the photographing apparatus to enter the following preparation mode or not after powering on, the status code of the set mode may be stored in the photographing apparatus.

For example, the user may set the photographing apparatus to enter the following preparation mode or exit the following preparation mode after power on.

In some exemplary embodiments, the following shoot method may further include: the photographing apparatus may detect a mode setting operation performed by a user, and may switch to a following preparation mode based on the mode setting operation. Therefore, the user may adaptively set whether the photographing apparatus is in the following preparation mode based on the photographing scene.

For example, when the photographing apparatus is not in the following preparation mode and does not perform a following shoot of a photographing target, if a control operation by a user on a manual control member is detected, the photographing apparatus is switched to the following preparation mode.

For example, if the photographing apparatus is not in the following preparation mode and not in a following shoot mode, it is switched to the following preparation mode based on a control operation on a manual control member mounted on the photographing apparatus or a control operation on a manual control member mounted on a handheld gimbal. Therefore, the user may control the photographing apparatus to switch to the following preparation mode by operating the manual control member that is associated with the following preparation mode.

For example, the photographing apparatus may determine, based on a setting instruction from the user, a manual control member to be one that may trigger the photographing apparatus to switch to the following preparation mode.

For example, the user may control the photographing apparatus to switch to the following preparation mode by operating a physical button, a knob or a trigger on the photographing apparatus, or a combination thereof to operate at least two of a physical button, a knob and a trigger.

For example, the user may control the photographing apparatus to switch to the following preparation mode by operating a physical button, a knob or a trigger on the handheld gimbal, or a combination thereof to operate at least two of physical buttons, knobs or triggers.

When the user performs photography with the photographing apparatus that is carried by the handheld gimbal, the user usually holds a handle of the handheld gimbal. Through an operation of the manual control member mounted on the handheld gimbal, a user may control the photographing apparatus to switch to the following preparation mode, thereby controlling the photographing apparatus to switch to the following preparation mode conveniently and quickly.

For example, if the handheld gimbal detecting a control operation from a user on a manual control member, it may sends a control signal to the photographing apparatus, so that the photographing apparatus may switch, based on the control signal, to a following preparation mode if it is not in the following preparation mode, and also not in the following shoot mode.

For example, if the photographing apparatus detects that an action attitude of the user matches a preset action attitude, it switches to the following preparation mode based on the preset action attitude.

Specifically, when performing photography with the photographing apparatus that is carried by the handheld gimbal, the user may place one hand in a photography direction of the photographing apparatus and make a corresponding gesture. The photographing apparatus detects the gesture in a photographed image, and determines whether the detected gesture matches a preset gesture, for example, both are a gesture of spreading five fingers. If the detected gesture matches the preset gesture, the photographing apparatus switches to the following preparation mode based on the gesture of the user.

Specifically, when performing photography with the photographing apparatus that is carried by the handheld gimbal, the user may quickly move the handheld gimbal. If the photographing apparatus detects that a fast-moving acceleration is greater than a preset threshold, or the handheld gimbal informs the photographing apparatus after detecting that a fast-moving acceleration is greater than a preset threshold, the photographing apparatus may switch to the following preparation mode based on the fast-moving action.

For example, if a user finds a hot event, such as a person or an animal the user wants to photograph, the user may quickly change the photographing direction toward the hot event. The photographing apparatus may automatically switch to the following preparation mode based on the action and become ready to photograph the hot event.

For example, if the photographing apparatus detects a touch operation by the user on a display screen that is configured to display an image, it may switches to the following preparation mode based on the touch operation.

For example, the user performs the touch operation on a photographing interface or a setting interface displayed on a display screen of the photographing apparatus. The photographing apparatus may switch to the following preparation mode based on the touch operation.

S120, If the photographing apparatus is in the following preparation mode, displays an area identifier.

The size of the area identifier is smaller than the size of the display screen of the photographing apparatus.

Figure 3:
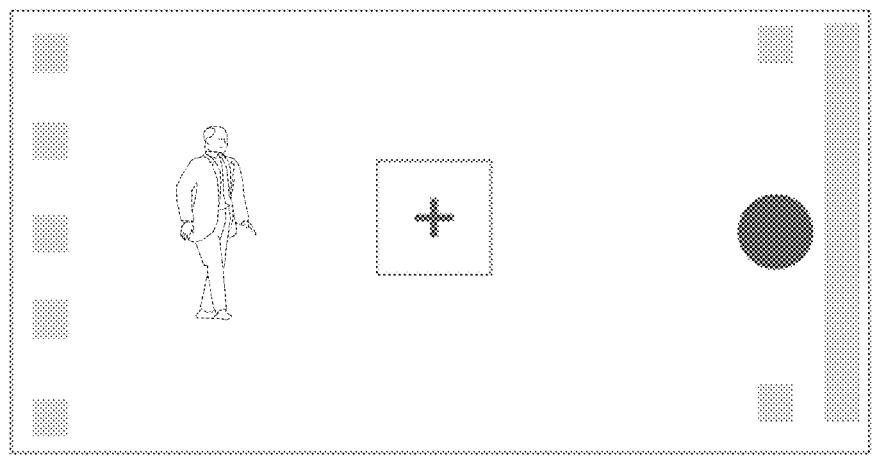
FIG. 3 is a schematic diagram of an area identifier displayed on the photographing apparatus.

FIG. 3 is a schematic diagram of an area identifier displayed on the photographing apparatus.

For example, the area identifier in FIG. 3 includes a box and a cross mark in the box.

In some exemplary embodiments, the area identifier may include at least one of a circle, a triangle, a solid line box, or a dashed line box.

For example, display the area identifier on the display screen of the photographing apparatus. The display screen may further display an image photographed by the photographing apparatus.

A user may also be prompted to control the photographing apparatus to switch to a following shoot mode via the area identifier displayed on the display screen of the photographing apparatus. The user may also be prompted to switch a photographing direction of the photographing apparatus so that the event intended to be photographed is located inside the area identifier. Therefore, the user may accurately adjust the photographing direction, and enable the photographing apparatus to accurately identify a photographing target.

Figure 4:
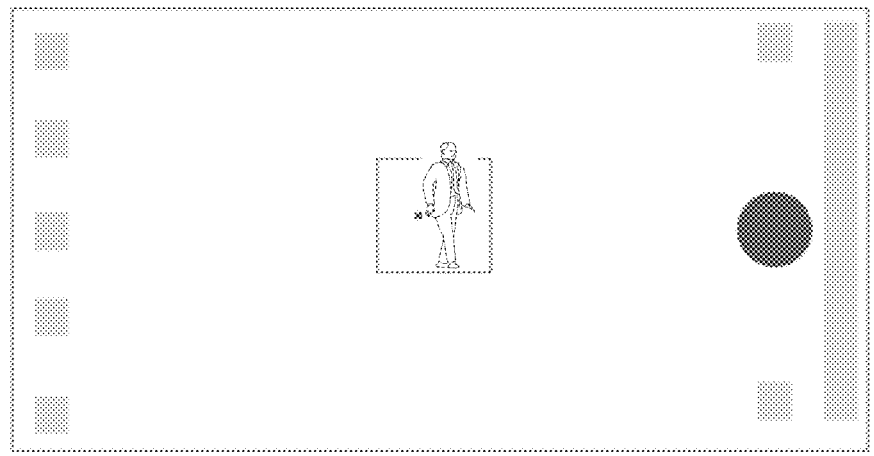
FIG. 4 is a schematic diagram of a photographing target determined based on an area identifier.

For example, as shown in FIG. 3, when the photographing apparatus is in the following preparation mode, if in an image photographed by the photographing apparatus, an event that the user intends to perform following shoot is not within the area identifier, but is located on the left side of the area identifier, the user may control the movement of the gimbal to make the photographing apparatus rotate to the left, until the event that the user intends to perform following shoot is located within the area identifier, as shown in FIG. 4.

For example, the center of the area identifier overlaps the center of the display screen.

In other examples, the center of the area identifier may be located on left, right, upper or lower side of the display screen. In this way, different image compositions modes may be implemented when performing the following shoot, such as keeping a photographing target on the left or center of the photographed image.

In some exemplary embodiments, the following shoot method may further include: detecting an area adjustment operation on an area identifier by a user, adjusting the size and/or the position of the area identifier based on the area adjustment operation.

For example, the user may adjust the size of the area identifier based on a distance between a photographing target and a photographing apparatus, or based on the size of the photographing target or the like. By adjusting of the area identifier based on different photographing scenes, the user may control the photographing apparatus conveniently to aim at the photographing target, and the photographing apparatus may accurately identify the photographing target.

For example, the user may adjust the position of the area identifier on a display screen based on the needs of image composition, such that the user can photograph an image as desired.

Specifically, the user may adjust the size and/or the position of the area identifier through a touch operation on the display screen; or may input, on a setting interface, a parameter to define the size and/or the position, for example, the length, width, center coordinates, etc.

S130, Determine whether a target shown in an image is a photographing target based on the area identifier.

For example, the photographing target may be specifically a target located within the area identifier, or a target within a preset range from the area identifier.

The photographing apparatus may determine the photographing target in the photographed image based on a user's visible area identifier, which may, on the one hand, facilitate the user to adjust the photographing direction to aim at the photographing target, and on the other hand, making the photographing target determined by the photographing apparatus more accurate and meet the user's expectation.

In some exemplary embodiments, the determining on whether a target shown in an image is a photographing target based on an area identifier includes: if the in the image, a target shown in a part of the picture within the area identifier and within a preset range from the area identifier, determining the target as the photographing target.

For example and as shown in FIG. 4, if the photographing apparatus is in the following preparation mode, it may automatically scan in real time for a target(s) within and around a certain range, such as people or objects, and determine the photographing target.

By appropriately expanding the detection range for the photographing target, the photographing target in the photographed image or the photographing target located at the edge of the area identifier may be identified. For example, when the size of the photographing target in the photographed image is greater than the area identifier, the photographing target may still be accurately identified.

For example, foreground detection may be performed on a part of a picture within the area identifier and within a preset range from the area identifier in the image, and then the target partially shown in the picture may be determined based on a detection result.

For example, by using a foreground detection algorithm, for example, frame difference method, optical flow method, etc., a foreground area of a part of the picture within the area identifier and within the preset range from the area identifier in the image may be detected, if the size of the detected foreground area is greater than a preset threshold, determine the foreground area as the photographing target.

The foreground area may be more prominent in the image, and a prominent target may be determined as the photographing target.

S140, upon determining that the target shown in the image is the photographing target, detect a control operation on a manual control member by a user.

For example, if in the photographed image, a part of the picture within the area identifier and within the preset range from an area identifier includes the photographing target, the basic condition for switching to the following shoot mode may be satisfied.

Specifically, when the photographing apparatus is in the following preparation mode and a photographing target is determined, the following shoot mode may be started by detecting the control operation of the user.

In some exemplary embodiments, the detection by the photographing apparatus of the control operation of the user on the manual control member includes: detecting whether the user operates a manual control member mounted on a handheld gimbal that carries a photographing apparatus.

For example, if the handheld gimbal detects the control operation of the user on the manual control member, it may send a control signal to the photographing apparatus.

The detection by photographing apparatus whether the user operates the manual control member of the handheld gimbal that carries the photographing apparatus includes: the photographing apparatus determining whether the user operates the manual control member mounted on the handheld gimbal based on the control signal sent by the handheld gimbal.

For example, the manual control member may include as least one of a trigger, a knob or a button.

For example, the user may control the photographing apparatus to start the following shoot mode by operating a physical button, a knob or a trigger on the handheld gimbal, or a combination of at least two of a physical button, a knob or a trigger.

For example, the photographing apparatus may, based on a setting instruction of the user, determine the manual control member mounted on the handheld gimbal to be one that may trigger the photographing apparatus to start the following shoot mode.

When the user performs photography by the photographing apparatus that carried by the handheld gimbal, the user usually holds a handle of the handheld gimbal. Through the operation on the manual control member mounted on the handheld gimbal to control the photographing apparatus to start the following shoot mode, the user may control the photographing apparatus to switch to the following preparation mode more conveniently and quickly, and may also reduce an impact of jitter caused by a control operation on the photographed image; so that the photographing process may be more rapid and convenient, and the user experience may be more smoothly.

For example, if the handheld gimbal detects the control operation on the manual control member mounted on the handheld gimbal performed by the user, it may sends the control signal to the photographing apparatus, the photographing apparatus may then determine the control operation of the user on the manual control member by based on the control signal.

In some exemplary embodiments, the detection, by a photographing apparatus, of a control operation of a user on a manual control member may include: detecting the control operation of the user on the manual control member mounted on the photographing apparatus.

For example, the user may control the photographing apparatus to start the following shoot mode by operating a physical button, a knob or a trigger on the photographing apparatus, or a combination of at least two of a physical button, a knob, and a trigger. In some scenarios such as when one hand is closer to the manual control member mounted on the photographing apparatus, the user may control the photographing apparatus to start the following shoot mode through the manual control member mounted on the photographing apparatus.

S150, Control to start or end a following shoot mode based on the control operation.

The following shoot mode is used to perform following shoot of the photographing target.

In some exemplary embodiments, the controlling to start the following shoot mode based on the control operation include: in the following preparation mode, if detecting the control operation of a user on a manual control member, starting to perform following shoot of a photographing target.

For example, when the photographing apparatus is in the following preparation mode and determines the photographing target based on the area identifier, if it detects the control operation of the user on the manual control member, controls to start the following shoot mode; if detecting that the user operates the manual control member, performs the following shoot more quickly on the determined photographing target.

For example, if the handheld gimbal detects the control operation of the user on the manual control member, it may sends the control signal to the photographing apparatus, so that the photographing apparatus starts, based on the control signal, to perform the following shoot on the photographing target when in the following preparation mode.

Through the operation of the manual control member mounted on the handheld gimbal to control the photographing apparatus to start the following shoot mode, the user may control the photographing apparatus to switch to the following shoot mode more conveniently and quickly, and may also reduce an impact of a jitter caused by the control operation on the photographed image; so that the photographing process may be more rapid and convenient, and the user experience may be smoother.

For example, the following shoot of the photographing target may include: adjusting the movement of the handheld gimbal that carries the photographing apparatus to perform following shoot on the photographing target.

For example, after starting the following shoot mode, the photographing apparatus may send the control instruction to the handheld gimbal, so that the handheld gimbal may move based on the control instruction. For example, the handheld gimbal may adjust the photographing direction of the photographing apparatus by controlling the movement of at least one of a pitch shaft motor, a roll shaft motor or a yaw shaft motor. In this way, the photographing direction may be adjusted to follow the movement of the photographing target so as to implement the following shoot.

For example, the photographing apparatus may generate the target following instruction based on the movement of the photographing target, and may send a target following instruction to the handheld gimbal. The handheld gimbal may adjust the movement based on the target following instruction so that the photographing apparatus may perform the following shoot of the photographing target.

For example, the target following instruction may include: a movement direction, angle, or the like of the handheld gimbal. The handheld gimbal may adjust the speed and acceleration of its movement or the movement of the photographing apparatus based on the magnitude of the movement as necessary, so as to ensure a smooth transition between the photographed images.

For example, the photographing apparatus may adjust the movement of the handheld gimbal to keep the photographing target to be located in the area identifier of the image.

For example, as shown in FIG. 4, when the photographing apparatus detecting that the photographing target is moving to the right relative to the photographing apparatus, the photographing apparatus may control the handheld gimbal to move to the right, so that the photographing direction of the photographing apparatus is also shifted to the right; in this way, the photographing target may be maintained located in the area identifier of the photographed image.

For example, the photographing apparatus may detect, in the photographed image, whether the photographing target is located in the area identifier; if the photographing target goes beyond the area identifier, the photographing apparatus may adjust the movement of the handheld gimbal, so as to move the photographing target smoothly into the area identifier. In this way, a smooth transition between the images photographed by the photographing apparatus may be achieved, and picture jitter may be reduced.

Specifically, the photographing apparatus may detect in real time the position of the photographing target in the photographed image, and may control the movement of the handheld gimbal when the photographing target goes beyond a preset distance from the area identifier.

For example, the photographing apparatus may obtain corresponding location information that the photographing target goes beyond the area identifier; and may adjust the movement of the handheld gimbal, based on the location information, so as to move the photographing target smoothly into the area identifier.

Specifically, if the photographing apparatus detects that the distance of the photographing target from the right side of the area identifier is greater than a preset distance, controls the handheld gimbal to move to the right.

In some exemplary embodiments, the control to end the following shoot mode based on a control operation, may include: when in the following shoot mode, if detecting the control operation of a user on a manual control member, ending the following shoot on the photographing target.

For example, after the photographing apparatus starts the following shoot mode, if detecting the control operation of the user on the manual control member, it controls to end the following shoot mode to stop the following shoot on the photographing target. Therefore, the user may end the following shoot mode quickly.

For example, if the handheld gimbal detects the control operation of the user on the manual control member, it may send a control signal to the photographing apparatus, so that the photographing apparatus may end the following shoot on the photographing target when performing the following shoot on the photographing target.

For example, the manual control member may include as least one of a trigger, a knob, or a button.

For example, the user may control the photographing apparatus to start the following shoot mode by operating a physical button, a knob or a trigger on the handheld gimbal, or a combination of at least two of a physical button, a knob or a trigger.

For example, the photographing apparatus may, based on the setting instruction of the user, determine the manual control member mounted on the handheld gimbal to be one that may trigger the photographing apparatus to end the following shoot mode.

Through the operation of the manual control member mounted on the handheld gimbal to control the photographing apparatus to end the following shoot mode, the user may control the photographing apparatus to end the following shoot mode more conveniently and quickly, and may also reduce an impact of jitter caused by the control operation on the photographed image; so that the photographing process may be more rapid and convenient, and the user experience may be smoother.

In some exemplary embodiments, the detection, by a photographing apparatus, of a control operation of a user on a manual control member may include: detecting the control operation by the user of the manual control member mounted on the photographing apparatus.

For example, the user may control the photographing apparatus to end the following shoot mode by operating a physical button, a knob or a trigger on the photographing apparatus, or a combination of at least a physical button, a knob or a trigger. In some scenarios such as when one hand is closer to a manual control member mounted on a photographing apparatus, a user may control the photographing apparatus to end the following shoot mode through the manual control member mounted on the photographing apparatus.

In the following shoot method provided by the foregoing exemplary embodiments, the user is prompted to place the shooting target in the area identifier by displaying the area identifier in the following preparation mode, so that the shooting target can be accurately determined; moreover, according to the detection of the control operation of the user on the manual control member, the following shoot mode may be controlled to start or end, which is convenient for the user to quickly start or end the following shoot and avoid missing the best time for the following shoot.

Referring to FIG. 5, FIG. 5 is a schematic flowchart of a gimbal control method according to some exemplary embodiments of the present disclosure. The gimbal control method may be executed by a handheld gimbal, such as a handheld gimbal that may carry an independent photographing apparatus, or a handheld gimbal integrated with a photographing apparatus, such as an integrated gimbal camera.

The following describes in detail a gimbal control method provided in some exemplary embodiments of the present disclosure based on the photographing apparatus and the handheld gimbal in FIG. 1.

As shown in FIG. 5, the gimbal control method in some exemplary embodiments may include step S210 and step S220.

S210, Detect a control operation of a user on a manual control member of the gimbal, and control, based on the control operation, a photographing apparatus carried by the handheld gimbal to start or end a following shoot mode.

For example, the manual control member may be mounted on a handle of the handheld gimbal.

For example, the detection of the control operation of the user on the manual control member may include: detecting the control operation of the user on the manual control member mounted on the handle of the handheld gimbal.

Specifically, the manual control member may include as least one of a trigger, a knob, or a button.

For example, the control operation of the user on the manual control member may include: the user operating a physical button, a knob or a trigger on the photographing apparatus, or a combination of at least two of a physical button, a knob or a trigger.

For example, the photographing apparatus may, based on a setting instruction of the user, determine the manual control member of the handheld gimbal to be one that may trigger the photographing apparatus to start or end the following shoot mode. When detecting that the determined manual control member is operated by the user, the photographing apparatus carried by the handheld gimbal may be controlled to start or end the following shoot mode.

When the user performs photography by the photographing apparatus that is carried by the handheld gimbal, the user usually holds the handle of the handheld gimbal, Using the operation of the manual control member mounted on the handheld gimbal to control the photographing apparatus to start the following shoot mode, the user may control the photographing apparatus to switch to the following preparation mode more conveniently and quickly, and may also reduce an impact of a jitter caused by the control operation on the photographed image; so that the photographing process may be more rapid and convenient, and the user experience may be more smooth.

In some exemplary embodiments, in step S210, the control of the photographing apparatus based on the control operation to start the following photography mode may include: controlling the photographing apparatus based on the control operation to start the following shoot mode from the following preparation mode.

Specifically, if in the following preparation mode, the photographing apparatus may switch from a following preparation mode to a following shoot mode based on the control of a user. If the photographing apparatus is not in the following preparation mode, it does not detect the control operation of the user on the manual control member, or does not start the following shoot mode when detecting the control operation of the user on the manual control member. This may prevent the user from accidentally starting the following shoot mode when the user does not desire to do so.

For example, if the handheld gimbal detects the control operation of the user on the manual control member, it may sends a control signal to the photographing apparatus, so that the photographing apparatus, based on the control signal, may start the following shoot on the photographing target when it is in the following preparation mode.

For example, the photographing apparatus may display the area identifier when in the following shoot mode; and may determine whether the target shown in the image is the photographing target based on the area identifier.

The user may be prompted to control the photographing apparatus and switch to the following shoot mode through displaying an area identifier on the display screen of the photographing apparatus. The user may also be prompted to switch the photographing direction of the photographing apparatus so that the event intended to be photographed is located within the area identifier. Therefore, the user may accurately adjust the photographing direction, and enable the photographing apparatus to accurately identify the photographing target.

Specifically, when the photographing apparatus is in the following preparation mode and determines a photographing target, the following shoot mode may be started by detecting the control operation of the user on the manual control member mounted on the handheld gimbal.

In some exemplary embodiments, the gimbal control method may further include: detecting a control operation of a user on a manual control member, controlling, based on the control operation, a photographing apparatus to switch to a following preparation mode.

If the photographing apparatus is not in the following preparation mode and also not in the following shoot mode, switch to the following preparation mode based on the control operation of the user on the manual control member mounted on the handheld gimbal. Therefor the user may control the photographing apparatus to switch to the following preparation mode by operating the manual control member that associated with the following preparation mode.

For example, if the handheld gimbal detects the control operation of the user on the manual control member, it may send the control signal to the photographing apparatus, so that the photographing apparatus may, based on the control signal, switch to the following preparation mode if it is not in the following preparation mode and does not start the following shoot mode.

When the user performs photography by the photographing apparatus carried by the handheld gimbal, the user usually holds a handle of the handheld gimbal; when using the operation of the manual control member mounted on the handheld gimbal to control the photographing apparatus to switch to the following preparation mode, the user may control the photographing apparatus to switch to the following preparation mode more conveniently and quickly.

S220, if the gimbal controls the photographing apparatus based on the control operation to start the following shoot mode, the gimbal adjusts its movement based on the control of the photographing apparatus, so that the photographing apparatus may perform the following shoot on a photographing target.

For example, after the following shoot mode is started, the photographing apparatus may send the control instruction to the handheld gimbal, so that the handheld gimbal may move based on the control instruction. For example, the handheld gimbal may adjust the photographing direction of the photographing apparatus by controlling the movement of at least one of a pitch shaft motor, a roll shaft motor, or a yaw shaft motor. In this way, the photographing direction may be adjusted to follow the movement of the photographing target to so as to implement the following shoot.

In some exemplary embodiments, the adjustment of the movement based on the control of the photographing apparatus so that the photographing apparatus may perform the following shoot on the photographing target may include: obtaining a target following instruction generated by the photographing apparatus based on the movement of the photographing target; and adjusting the movement based on the target following instruction, so that the photographing apparatus performs the following shoot of the photographing target.

For example, the target following instruction may include: a movement direction, a movement angle, etc. of the handheld gimbal. The handheld gimbal may adjust the speed and acceleration of the movement based on the magnitude of the movement as necessary, so as to ensure a smooth transition between the photographed image.

For example, the adjustment of the movement based on the target following instruction, so that the photographing apparatus may perform the following shoot on the photographing target may include: adjusting the movement to keep the photographing target within an area identifier of an image photographed by the photographing apparatus.

For example, as shown in FIG. 4, when the photographing apparatus detects that the photographing target is moving to the right relative to the photographing apparatus, the photographing apparatus may control the handheld gimbal to move to the right so that the photographing direction of the photographing apparatus is also shifted to the right; therefore, the photographing target may be maintained within the area identifier of the photographed image.

For example, the handheld gimbal may adjust its movement, so that when the photographing target goes beyond the area identifier, the photographing target may be moved smoothly into the area identifier.

For example. The photographing apparatus may detect, in the photographed image, whether the photographing target is located in the area identifier; if the photographing target goes beyond the area identifier, the photographing apparatus may adjust the movement of the handheld gimbal, so as to move the photographing target smoothly into the area identifier. In this way, a smooth transition between the images photographed by the photographing apparatus may be implemented, and picture jitter may be reduced.

Specifically, the photographing apparatus may detect in real time the position of the photographing target in the photographed image, and may control the movement of the handheld gimbal when the photographing target goes beyond a preset distance from the area identifier.

For example, the photographing apparatus may obtain corresponding location information when the photographing target goes beyond the area identifier; and may then adjust the movement of the handheld gimbal based on the location information, so as to move the photographing target smoothly into the area identifier.

In some exemplary embodiment, in step S210, the control of the photographing apparatus based on the control operation to end the following shoot mode may include: controlling the photographing apparatus based on the control operation to end the following shoot of the photographing target when it is performing the following shoot on the photographing target For example, after the photographing apparatus starts the following shoot mode, if it detects the control operation of the user on the manual control member of the handheld gimbal, it may control to end the following shoot mode so as to stop the following shoot on the photographing target. Therefore, the user may end the following shoot mode quickly.

For example, if the handheld gimbal detects the control operation of the user on the manual control member, it may send the control signal to the photographing apparatus, so that the photographing apparatus that is performing the following shoot of the photographing target ends the following photographing on the photographing target.

Through the operation of the manual control member mounted on the handheld gimbal to control the photographing apparatus to end the following shoot mode, the user may control the photographing apparatus to end the following shoot mode more conveniently and quickly, and may also reduce an impact of a jitter caused by the control operation on the photographed image, so that the photographing process may be more rapid and convenient, and the user experience may be smoother.

In the gimbal control method provided in the foregoing exemplary embodiments, by detecting a control operation of a user on a manual control member mounted on the handheld gimbal, a photographing apparatus carried by the handheld gimbal may be controlled to start or end a following shoot mode, to start or end adjusting the movement based on the control of the photographing apparatus, so that the photographing apparatus may perform following shoot on the photographing target. This is convenient for a user to quickly start or end the following shoot, and can avoid missing the best time of following shoot.

The specific principles and implementation of the following shoot method provided in the embodiments of the present disclosure are similar to the following shoot method and the gimbal control method described in the above exemplary embodiment, details will not be described again herein.

With reference to the above exemplary embodiments, FIG. 6 is a schematic block diagram of a photographing apparatus according to some exemplary embodiments of the present disclosure. The photographing apparatus 600 may include at least one processor 601 and at least one memory (or storage medium) 602, the processor 601 and the memory 602 are connected via a bus 603; the bus 603 may be, for non-limiting example, an inter-integrated circuit (I2C) bus.

Specifically, the processor 601 may include one or more processors, and may be, for example, a micro-controller unit (MCU), a central processing unit (CPU), a digital signal processor (DSP), or the like.

Specifically, the memory 602 may include one or more storage media, and may be, for example, a flash chip, a read-only memory (ROM), a magnetic disk, an optical disc, a USB flash drive, a removable hard disk, or the like.

The processor 601 may be configured to run a computer program which is stored in the memory 602, and configured to implement the above-described gimbal control method when executing the computer program.

For example, the processor 601 may be configured to run a computer program that stored in the memory 602, and configured to implement following steps when executing the computer program:

determining whether it is in a following preparation mode;

if it is in the following preparation mode, displaying an area identifier, where the size of the area identifier is smaller than the size of a display screen of the photographing apparatus;

determining whether a target shown in an image is a photographing target based on the area identifier;

when determining the target shown in the image is the photographing target, detecting a control operation of a user on a manual control member;

controlling to start or end the following shoot mode based on the control operation; and performing following shoot on the photographing target in the following shoot mode.

Specifically, when the processor 601 determines whether the target shown in the image is the photographing target based on the area identifier, it may perform:

If in the image, the target shown in a part of the picture within the area identifier and within a preset range from the area identifier, the target is determined as the photographing target.

Specifically, the processor 601 implements the following: in the image, the target shown in a part of the picture within the area identifier and/or within a preset range from the area identifier, the target is determined as the photographing target, by:

performing a foreground detection on a part of the picture within the area identifier and within a preset range from the area identifier in the image, and determining the target shown in a part of the picture based on the detection result.

Specifically, the processor 601 further implements: detecting the area adjustment operation of the area identifier, and adjusting the size and/or the position of the area identifier based on the area adjustment operation.

Specifically, the center of the area identifier overlaps the center of the display screen.

Specifically, when the processor 601 implements the control of the start of the following shoot mode based on the control operation, it implements:

when in a following preparation mode, if detecting the control operation by the user on the manual control member, starting to perform the following shoot on the photographing target.

Specifically, when the processor 601 implements the following shoot of the photographing target, it implements:

adjusting the movement of the handheld gimbal that carries the photographing apparatus to perform the following shoot of the photographing target.

Specifically, when the processor 601 implementing the adjustment on the movement of the handheld gimbal to perform the following shoot of the photographing target, it implements:

adjusting the movement of the handheld gimbal to keep the photographing target located in the area identifier of the image.

Specifically, when the processor 601 implements the adjustment of the movement of the handheld gimbal to keep the photographing target within the area identifier of the image, it implements:

detecting, in the image photographed, by the photographing apparatus whether the photographing target is located in the area identifier;

If the photographing target goes beyond the area identifier, adjusting the movement of the handheld gimbal to move the photographing target smoothly into the area identifier.

Specifically, when the processor 601 implements the adjustment on the movement of the handheld gimbal to move the photographing target smoothly in the area identifier, it implements:

obtaining location information corresponding to that the photographing target goes beyond the area identifier;

adjusting the movement of the handheld gimbal based on the location information, so as to move the photographing target smoothly into the area identifier.

Specifically, when the processor 601 implements the control of the end of the following shoot mode based on the control operation, it implements:

when performing the following shoot of the photographing target, if detecting the control operation of the user on the manual control member, ending the following shoot of the photographing target.

Specifically, during detecting the control operation of the user on the manual control member, the processor 601 implements:

detecting whether the user operates the manual control member of the handheld gimbal that carries the photographing apparatus.

Specifically, the manual control member includes as least one of a trigger, a knob, or a button.

Specifically, the processor 601 further implements:

detecting the mode setting operation of the user, and switch to the following preparation mode based on the mode setting operation.

Specifically, when detecting the mode setting operation and switching to the following preparation mode based on the mode setting operation, the processor 601 implements:

when the photographing apparatus is not in the following preparation mode and does not perform the following shoot on the photographing target, if a control operation of the user on the manual control member is detected, switching to the following preparation mode based on the control operation.

Some exemplary embodiments of the present disclosure further provide a computer readable storage medium, the computer readable storage medium stores a computer program, the computer program includes a program instruction(s), and a processor may execute the program instruction to implement steps of the method of following shoot according to the above exemplary embodiments.

The computer readable storage medium may be an internal storage unit of the photographing apparatus in the above exemplary embodiments, such as a hard disk or an internal memory of the photographing apparatus. The computer readable storage medium may also be an external storage device of the photographing apparatus, for non-limiting examples, a plug-in hard disk equipped on the photographing apparatus, a smart media card (SMC), a secure digital (SD) card, a flash card, or the like.

With reference to the above exemplary embodiments, FIG. 7 is a schematic block diagram of a handheld gimbal according to some exemplary embodiments of the present disclosure The handheld gimbal 700 may include at least one processor 701 and at least one memory 702, the processor 701 and the memory 702 are connected via a bus 603, the bus 703 may be, for example, an I2C (Inter-integrated Circuit) bus.

Specifically, the processor 701 may be a micro-controller unit (MCU), a central processing unit (CPU), a digital signal processor (DSP), or the like.

Specifically, the memory 702 may be a flash chip, a read-only memory (ROM), a magnetic disk, an optical disc, a USB flash drive, a removable hard disk, or the like.

The processor 701 may be configured to run a computer program that is stored in the memory 702, and implement the above-described gimbal control method when executing the computer program.

For example, the processor 701 may be configured to run a computer program that is stored in the memory 702, and may implement following steps when executing the computer program:

detecting a control operation by a user on a manual control member, controlling, based on the control operation, a photographing apparatus carried by the handheld gimbal to start or end a following shoot mode;

if the photographing apparatus is controlled based on the control operation to start the following shoot mode, adjusting the movement based on the control of the photographing apparatus, so that the photographing apparatus performs the following shoot on a photographing target.

Specifically, during controlling the photographing apparatus based on the control operation to start a following shoot mode, the processor 701 implements:

controlling the photographing apparatus based on the control operation to start the following shoot mode when in the following preparation mode.

Specifically, during controlling the photographing apparatus based on the control operation to start the following shoot mode when in the following preparation mode, the processor 701 implements:

If a control operation of the user on the manual control member is detected, sending the control signal to the photographing apparatus, so that the photographing apparatus starts, based on the control signal, to perform the following shoot on the photographing target when in the following preparation mode.

Specifically, the processor 701 further implements: detecting the control operation of the user on the manual control member, and controlling, based on the control operation, the photographing apparatus to switch to the following preparation mode.

Specifically, during detecting the control operation of the user on the manual control member, and controlling the photographing apparatus based on the control operation to switch to the following preparation mode, the processor 701 implements:

upon detecting the control operation of the user on the manual control member, sending the control signal to the photographing apparatus, so that the photographing apparatus, based on the control signal, switches to the following preparation mode if it is not in the following preparation mode and not in the following shoot mode.

Specifically, during adjusting the movement based on the control of the photographing apparatus so that the photographing apparatus performs the following shoot of the photographing target, the processor 701 implements:

obtaining a target following instruction generated by the photographing apparatus based on the movement of the photographing target; and adjusting the movement based on the target following instruction so that the photographing apparatus performs the following shoot of the photographing target.

Specifically, during adjusting the movement so that the photographing apparatus performs the following shoot of the photographing target, the processor 701 implements:

adjusting the movement to keep the photographing target within an area identifier of an image photographed by the photographing apparatus;

Specifically, during adjusting the movement to keep the photographing target to be located in the area identifier of the image photographed by the photographing apparatus, the processor 701 implements:

adjusting the movement so that when the photographing target goes beyond the area identifier, the photographing target may be moved smoothly into the area identifier.

Specifically, during controlling the photographing apparatus based on the control operation to end the following shoot mode, the processor 701 implements:

controlling the photographing apparatus based on the control operation to end the following shoot of the photographing target when the photographing apparatus performs the following shoot of the photographing target.

Specifically, during controlling the photographing apparatus based on the control operation to end the following shoot of the photographing target when the photographing apparatus performs the following shoot of the photographing target, the processor 701 implements:

upon detecting the control operation of the user on the manual control member, sending the control signal to the photographing apparatus, so that the photographing apparatus ends the following photographing on the photographing target when it performs the following shoot of the photographing target.

Specifically, during detecting the control operation of the user on the manual control member, the processor 701 implements:

detecting the control operation of the user on the manual control member mounted on the handle of the handheld gimbal.

Specifically, the manual control member may include as least one of a trigger, a knob, or a button.

Some exemplary embodiments of the present disclosure further provide a computer readable storage medium, the computer readable storage medium stores a computer program, the computer program includes a program instruction(s), the processor executes the program instruction(s), to implement steps of the gimbal control method provided by the above exemplary embodiments.

The computer readable storage medium may be the handheld gimbal in any one of the above exemplary embodiments, such as an internal storage unit of the handheld gimbal, for example, a hard disk or an internal memory of the handheld gimbal. The computer readable storage medium may also be an external storage device of the handheld gimbal, for non-limiting examples, a plug-in hard disk equipped on the handheld gimbal, a smart media card (SMC), a secure digital (SD) card, a flash card, or the like.

With reference to the above exemplary embodiments, FIG. 8 is a schematic block diagram of a photographing system according to some exemplary embodiments of the present disclosure. The photographing system 10 may include the photographing apparatus 600 and the handheld gimbal 700.

For example, the photographing system 10 may include the handheld gimbal 700 that carries the photographing apparatus 600, such as a handheld gimbal that may carry a smart phone or a camera, or an integrated gimbal camera.

In some exemplary embodiment, the photographing apparatus 600 may be configured to determine whether it is in the following preparation mode, if it is in the following preparation mode, displays the area identifier, where the size of the area identifier is smaller than the size of the display screen of the photographing apparatus 600.

The photographing apparatus 600 may be configured to determine whether the target shown in the image is the photographing target based on the area identifier;

When the photographing apparatus 600 determines that the target shown in the image is a photographing target, it may detect a control operation of the manual control member of the user.

The photographing apparatus 600 may be configured to control to start or end the following shoot mode based on the control operation.

If the photographing apparatus 600 controls to start the following shoot mode, the handheld gimbal 700 that carries the photographing apparatus 600 may be controlled to adjust the movement, so that the photographing apparatus may perform the following shoot on the photographing target Specifically, the determining whether the target shown in the image is the photographing target based on the area identifier by the photographing apparatus 600 may include:

If in the image, the photographing apparatus 600 determines that a target is shown or appears in a part of the picture within the area identifier and/or within a preset range from the area identifier, the target is determined as the photographing target.

Specifically, in the image, the photographing apparatus' 600 determining that a target is shown or appears in a part of the picture within the area identifier and/or within a preset range from the area identifier, the target being determined as the photographing target includes:

The photographing apparatus 600 performs foreground detection on a part of the picture within the area identifier and within a preset range from the area identifier in the image, and determines the target shown in a part of the screen based on the detection result.

Specifically, the photographing apparatus 600 may be further configured to detect the area adjustment operation of the area identifier, adjust the size and/or the position of the area identifier based on the area adjustment operation.

Specifically, the center of the area identifier overlaps the center of the display screen.

Specifically, the photographing apparatus 600 controlling to start the following shoot mode based on the control operation may include:

when the photographing apparatus is in a following preparation mode, if the photographing apparatus 600 detects the control operation of the user on the manual control member, it starts to perform following shoot of the photographing target.

Specifically, the following shoot of the photographing target by the photographing apparatus 600 may include:

the photographing apparatus 600 adjusting the movement of the handheld gimbal 700 to keep the photographing target within the area identifier of the image photographed by the photographing apparatus 600.

Specifically, the photographing apparatus 600 adjusting the movement of the handheld gimbal 700 to keep the photographing target within the area identifier of the image photographed by the photographing apparatus 600 may include:

the photographing apparatus 600 detecting, in the image photographed, whether the photographing target is located in the area identifier;

if the photographing target goes beyond the area identifier, the photographing apparatus 600 adjusting the movement of the handheld gimbal 700, so as to move the photographing target smoothly into the area identifier.

Specifically, the photographing apparatus 600 adjusting the movement of the handheld gimbal 700, so as to move the photographing target smoothly into the area identifier may include:

the photographing apparatus 600 obtains the corresponding location information that the photographing target exceeds the area identifier.

The photographing apparatus 600 adjusts the movement of the handheld gimbal 700 based on the location information, so as to move the photographing target smoothly into the area identifier.

Specifically, the photographing apparatus 600 controlling the handheld gimbal 700 to adjust the movement so that the photographing apparatus performs the following shoot of the photographing target may include:

generating the target following instruction by the photographing apparatus 600 based on the movement of the photographing target;

sending, by the photographing apparatus 600, the target following instruction to the handheld gimbal 700, so that the handheld gimbal 700 may adjust the movement based on the target following instruction.

Specifically, the photographing apparatus 600 controlling to end the following shoot mode based on the control operation may include:

When performing the following shoot of the photographing target, the photographing apparatus 600 ending the following photographing of the photographing target based on the control operation.

Specifically, the photographing apparatus 600 detecting the control operation of the user on the manual control member may include:

the photographing apparatus 600 detecting whether the user operates the manual control member of the handheld gimbal 700.

Specifically, if the handheld gimbal 700 detects the control operation of the user on the manual control member, it sends the control signal to the photographing apparatus 600.

Specifically, the photographing apparatus 600 detecting whether the user operates the manual control member of the handheld gimbal 700 may include:

the photographing apparatus 600 determining whether the user operates the manual control member mounted on the handheld gimbal 700 based on the control signal sent by the handheld gimbal 700.

Specifically, the manual control member includes as least one of a trigger, a knob, or a button.

Specifically, the photographing apparatus 600 further may be configured to detect the mode setting operation of the user, and switch to the following preparation mode based on the mode setting operation.

Specifically, the photographing apparatus 600 detecting the mode setting operation by the user and switching to the following preparation mode based on the mode setting operation may include:

When the photographing apparatus 600 is not in the following preparation mode and does not perform the following shoot of the photographing target, if it detects the control operation by the user on the manual control member, it switches to the following preparation mode based on the control operation.

Some exemplary embodiments of the present disclosure further provide a computer readable storage medium, the computer readable storage medium stores a computer program, the computer program includes a program instruction(s), the processor executes the program instructions to implement steps of the method of following shoot for the photographing system as described in the above exemplary embodiments.

For the following shoot method, the gimbal control method, the photographing apparatus, the handheld gimbal, the photographing system and the computer readable storage medium provided in the present disclosure, the user is prompted to place the shooting target in the area identifier by displaying the area identifier in the following preparation mode, so that the shooting target can be accurately determined; moreover, according to the detection of the control operation of the user on the manual control member, the following shoot mode may be controlled to start or end, which is convenient for the user to quickly start or end the following shoot and avoid missing the best time for the following shoot.

It should be understood that the terminology used in the present disclosure is for the purpose of describing exemplary embodiments only, and is not intended to limit the present disclosure.

It should also be understood that the "and/or" used in the present disclosure and the claims refers to any combination of one or more of the associated listed items and all possible combinations, and includes such combinations.

What is disclosed above is merely some exemplary embodiments of the present disclosure, and is certainly not intended to limit the scope of protection of the present disclosure. Any equivalent modifications or replacements and the like within the technical scope of the present disclosure that can be conceived of by a person skilled in the art shall fall within the scope of protection of the present disclosure. Therefore, the scope of protection of the present disclosure shall be determined by the appended claims.

What is claimed is:

1. A gimbal control method, comprising:
   detecting a first control operation on a manual control member of a gimbal;
   in response to the first control operation, sending a first control signal to a photographing apparatus carried by the gimbal to start a following shoot mode on a photographing target;
   obtaining a target following instruction generated by the photographing apparatus based on a movement of the photographing target;
   in response to the target following instruction, adjusting a movement of the gimbal to enable the photographing apparatus to perform following shoot on the photographing target based on a current attitude of the photographing apparatus measured by at least one inertial measurement unit (IMU) provided on the gimbal; and
   in response to gimbal acceleration information meeting a preset condition, controlling to switch to a fast-moving mode to facilitate following, wherein the gimbal acceleration information is determined based on a measurement by the at least one IMU.

2. The gimbal control method according to claim 1, wherein the photographing apparatus is in a following preparation mode before starting the following shoot mode.

3. The gimbal control method according to claim 1, wherein the photographing target is determined by automatically scanning in real time.

4. The gimbal control method according to claim 2, further comprising:
   detecting the first control operation on the manual control member; and
   controlling, based on the first control operation, the photographing apparatus to switch to the following preparation mode.

5. The gimbal control method according to claim 1, wherein
   the adjusting of the movement of the gimbal to enable the photographing apparatus to perform following shoot on the photographing target includes:
   obtaining a target following instruction generated by the photographing apparatus based on a movement of the photographing target; and
   adjusting, based on the target following instruction, the movement of the-gimbal to enable the photographing apparatus to perform the following shoot on the photographing target.

6. The gimbal control method according to claim 1, further comprising:
   detecting the second control operation on the manual control member; and
   sending a second control signal to the photographing apparatus to enable the photographing apparatus that is performing the following shoot on the photographing target to end the following shoot on the photographing target.

7. The gimbal control method according to claim 1, wherein
   the detecting of the control operation on the manual control member includes:
   detecting the control operation on the manual control member mounted on a handle of the gimbal.

8. The gimbal control method according to claim 1, further comprising:
   determining a mode of a photographing apparatus carried by the gimbal:
   in response to the photographing apparatus being not in a following shoot mode, controlling the photographing apparatus to enter the following shoot mode, or in response to the photographing apparatus being in the following shoot mode, controlling the photographing apparatus to enter a non-following shoot mode; and obtaining a target following instruction generated by the photographing apparatus upon entering the following shoot mode based on a movement of the photographing target.

9. The gimbal control method according to claim 1, wherein the adjusting of the movement of the gimbal to enable the photographing apparatus to perform following shoot on the photographing target includes:

obtaining target information that the photographing target goes beyond an area identifier of an image displayed by the photographing apparatus, and thus disappears from the area identifier, and adjusting the movement of the gimbal based on the target information, so as to make the photographing target reappear in the area identifier, wherein a size of the area identifier is smaller than a size of the image displayed by the photographing apparatus.

10. A handheld gimbal, comprising:

a handle;

a gimbal mounted on the handle;

at least one storage medium storing a set of instructions for gimbal control; and at least one processor in communication with the at least one storage medium, wherein during operation, the at least one processor executes the set of instructions to:

detect a first control operation on a manual control member of a handheld gimbal;

in response to the first control operation, send a first control signal to a photographing apparatus carried by the gimbal to start a following shoot mode on a photographing target;

obtain a target following instruction generated by the photographing apparatus based on a movement of the photographing target;

in response to the target following instruction, adjust a movement of the handheld gimbal to enable the photographing apparatus to perform following shoot on the photographing target based on a current attitude of the photographing apparatus measured by at least one inertial measurement unit (IMU) provided on the gimbal; and in response to gimbal acceleration information meeting a preset condition, control to switch to a fast-moving mode to facilitate following, wherein the gimbal acceleration information is determined based on a measurement by the at least one IMU.

11. The handheld gimbal according to claim 10, wherein the photographing apparatus is in a following preparation mode before starting the following shoot mode.

12. The handheld gimbal according to claim 10, wherein the photographing target is determined by automatically scanning in real time.

13. The handheld gimbal according to claim 11, wherein the at least one processor further executes the set of instructions to:

detect the first control operation on the manual control member; and control, based on the first control operation, the photographing apparatus to switch to the following preparation mode.

14. The handheld gimbal according to claim 10, wherein to adjust the movement of the handheld gimbal to enable the photographing apparatus to perform following shoot on the photographing target, the at least one processor executes the set of instructions to:

obtain a target following instruction generated by the photographing apparatus based on a movement of the photographing target; and adjust, based on the target following instruction, the movement of the handheld gimbal to enable the photographing apparatus to perform the following shoot on the photographing target.

15. The handheld gimbal according to claim 10, wherein the at least one processor further executes the set of instructions to:

detect the second control operation on the manual control member; and send a second control signal to the photographing apparatus to enable the photographing apparatus that is performing the following shoot on the photographing target to end the following shoot on the photographing target.

16. The handheld gimbal according to claim 10, wherein the adjusting of the movement of the gimbal to enable the photographing apparatus to perform following shoot on the photographing target includes:

obtaining target information that the photographing target goes beyond an area identifier of an image displayed by the photographing apparatus, and thus disappears from the area identifier, and adjusting the movement of the gimbal based on the target information, so as to make the photographing target reappear in the area identifier, wherein a size of the area identifier is smaller than a size of the image displayed by the photographing apparatus.

17. The handheld gimbal according to claim 10, wherein to detect the control operation on the manual control member, the at least one processor executes the set of instructions to:

detect the control operation on the manual control member mounted on the handle of the gimbal.

18. A device, comprising:

a gimbal configured to carry a photographing apparatus;

a manual control member;

at least one storage medium storing a set of instructions for control; and at least one processor in communication with the at least one storage medium, wherein during operation, the at least one processor executes the set of instructions to:

detect a first control operation on the manual control member, determine a photographing target of the photographing apparatus based on the control operation, control the photographing apparatus to start a following shoot mode, obtain a target following instruction generated by the photographing apparatus based on a movement of the photographing target, in response to the target following instruction, adjusting, based on the target following instruction, a movement of the gimbal to enable the photographing apparatus to perform following shoot on the photographing based on a current attitude of the photographing apparatus measured by at least one inertial measurement unit (IMU) provided on the gimbal; and in response to gimbal acceleration information meeting a preset condition, control to switch to a fast-moving mode to facilitate following, wherein the gimbal acceleration information is determined based on a measurement by the at least one IMU.

19. The device according to claim 18, wherein the adjusting of the movement of the gimbal to enable the photographing apparatus to perform following shoot on the photographing target includes:
- obtaining target information that the photographing target goes beyond an area identifier of an image displayed by the photographing apparatus, and thus disappears from the area identifier, and
- adjusting the movement of the gimbal based on the target information, so as to make the photographing target reappear in the area identifier, wherein a size of the area identifier is smaller than a size of the image displayed by the photographing apparatus.

* * * * *